United States Patent Office 2,841,428
Patented July 1, 1958

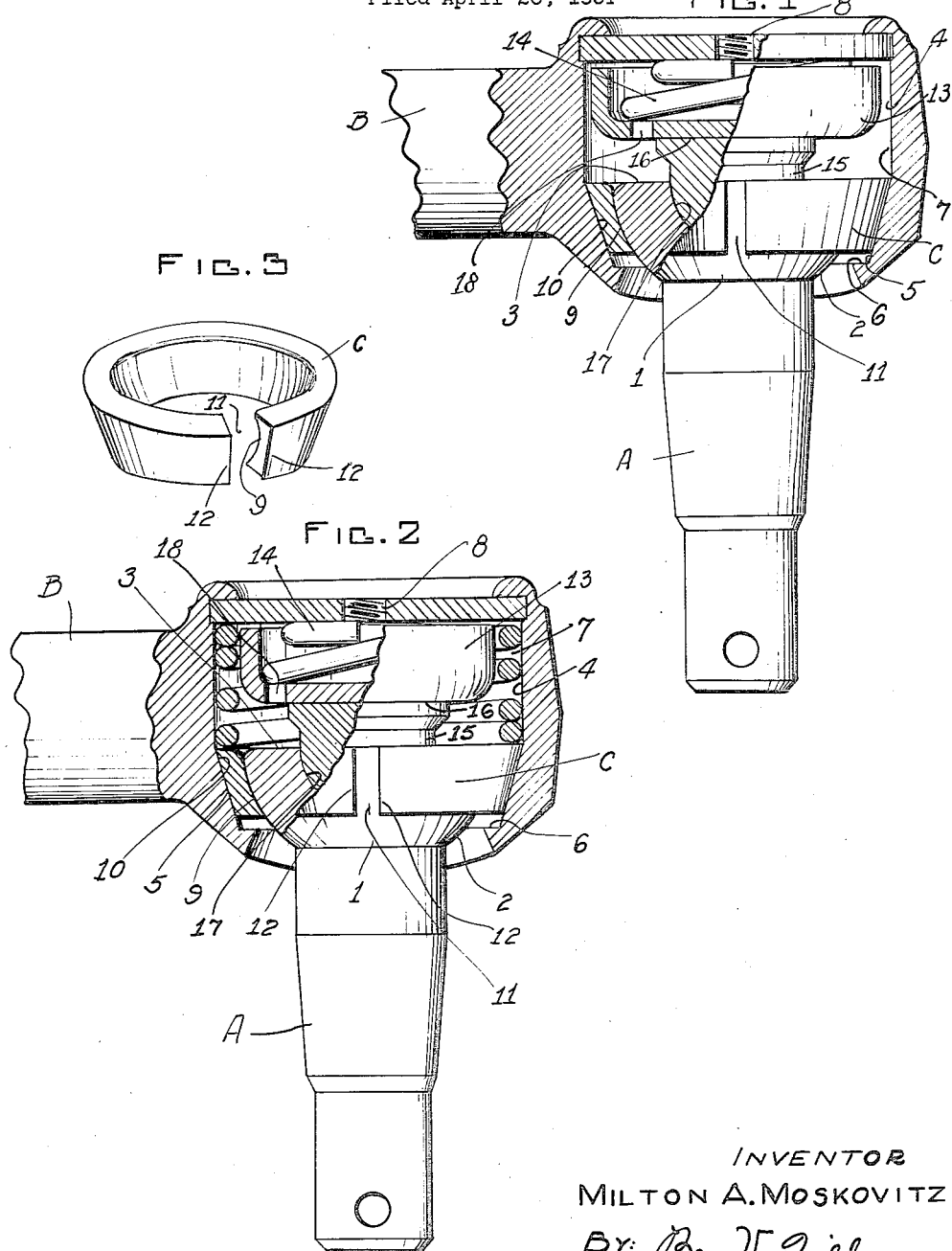

2,841,428

TIE-ROD JOINT WITH WEAR-COMPENSATING BEARING

Milton A. Moskovitz, St. Louis, Mo., assignor of one-half to Harry Frankel, St. Louis, Mo.

Application April 26, 1951, Serial No. 223,014

2 Claims. (Cl. 287—90)

This invention relates to improvements in tie-rod joints, and more particularly to bearing seats therefor, that will be relatively simple to make and install, which will provide a maximum of bearing conformity, which will tend to remain in proper position, be long-wearing, certain and safe in action, and which will be otherwise satisfactory and efficient for use wherever deemed applicable.

One of the principal objects of the invention is to construct such a bearing and associated parts of the joint structure in a manner that there will be no unwanted looseness or play between the relatively movable parts and which might become so serious as to spoil the efficient operation of the mechanism, but will, on the contrary, automatically actuate the bearing element of the joint to take up such wear as the same occurs and thus maintain the maximum of bearing conformity, all without manual adjustment.

Another important object of my invention is to so construct such a joint that the socket member thereof will be formed with a bearing-receiving chamber that has a portion provided with a tapered bore, and with the bearing element having a correspondingly tapered external peripheral surface to slidably engage said tapered portion of the bore and be shiftable axially of the latter.

A further object of the invention is to so construct the externally tapered bearing of the kind aforesaid, in the shape of a substantially radially split ring that will seat against said correspondingly tapered portion of the bore through the socket member of the joint, and whereby axial thrust on the bearing will force it to wedge in said bore as it is slid toward the reduced diametral end of the seat and will at the same time contract the ring through such axial shift of the latter.

An added object of my invention is to so construct such a joint mechanism that it may be easily and fully lubricated forcibly, without danger of buckling, breakage or other damage to the parts, there being a split or opening through said ring, extending for the full thickness and depth of the ring to provide a continuously unobstructed passage or channel therethrough and therealong to provide a relief for the passage of said lubricating under pressure.

Many other objects and advantages of the construction herein shown and described, will be obvious to those skilled in the art to which this invention appertains, and as will be clear from the disclosures herein given.

To this end, my invention consists in the novel construction, arrangement and combination of parts herein shown and described, and as will be more readily understood as they are more clearly pointed out in the following specification.

In the drawings, wherein like or corresponding parts are represented by like reference characters, Figure 1 is a cross-sectional view, partly in elevation, showing a tie-rod joint of my improved construction;

Figure 2 is a similar view of another form of the same; and

Figure 3 is a perspective view of the split main bearing that forms an important element of the joint structure.

Referring more particularly to the drawings, wherein I have illustrated the preferred forms of my invention, there is shown a joint between a pair of relatively movable members, as for example between the stud member A and the socket member B forming a tie-rod joint of the type employed in automobile construction so that said pair of members have a universal movement relatively of one another.

This stud member A has a shank portion terminating in an enlarged head 1 whose external peripheral surface 2 is shaped into a rounded or segmental spherical end, and in this instance it has a substantially flat or planar top face 3 that defines the top face of the enlarged head.

The socket member B has an opening or bore 4 transversely therethrough, said bore at its lower end being decreasingly tapered or reduced as indicated at 5, and a radially inwardly directed flange or shoulder 6 that forms the bottom end wall of the bore and a lubricant-receiving chamber 7. This flange also defines the lowermost or diametrally smallest portion of the tapered portion 5 of the chamber.

The upper end of said bore 4 may be closed with a disk suitably positioned thereacross, and said disk may be formed with an inlet opening 8 to receive a grease-gun fitting or the like whereby lubricant may be supplied to within said chamber 7.

A ring or annular element C is interposed to act as a main bearing for the joint, said ring having an inner concaved or segmentally spherically rounded face 9 to receive and form a seat for the exterior complementally rounded external surface 2 of the stud head, the external peripheral surface 10 of said ring being conical or decreasingly tapered toward its lower edge. It is obvious that the external conical surface of the ring bearingly engages and fits smoothly on the complemental tapered face 5 of the socket opening.

This ring is transversely or radially split at 11, with the ends 12—12 of the ring being farthest apart when the ring is in its initial operating position in substantially the positions shown in Figs. 1 and 2. The split ring is not as wide or deep as the axial depth or width of the tapered portion 5 of the bore, so that when the ring is initially in place as indicated, and before wear and adjustment occurs, the reduced end of said ring will be spaced an appreciable distance from the adjacent flange or shoulder 6, such spacing determining the amount of adjustment that the ring may move toward said flange, as wear between the parts takes place, and as will be more clearly hereinafter pointed out.

In the event that the stud head is jolted out of its seat in said bearing ring, as might readily occur when the vehicle passes over a rough spot along the road, the ring too may lift axially at such interval, and when it is brought down again to wedge into place between the conically tapered portion of the bore and the stud head, it may have rotated through a slight arc. This insures a relatively fresh bearing relationship between the stud and the ring, and such action is thus conducive to prolonging the wear qualities of the ring, and much improving the accuracy of conformity of bearing between the ring and the stud head.

A pressure plate or cup element 13 is preferably interposed between said disk and the enlarged head of the stud, said element 13 being constantly urged toward said stud head by a spring 14 or any like-acting element, said spring being placed in the assembly under an initial load.

It is preferable that an auxiliary bearing element 15 be interposed between the stud head and said pressure element 13, said element 15 having an uppermost planar face 16 to slidably engage the under planar face of the plate 13, and the lower portion of the element 15 is spherically rounded to provide a rounded surface 16 to complement and fit the rounded surface portion 17 at the top of the stud head. The centers of curvature of the engaging faces of said element 15 and the enlarged rounded head are identical and coincident.

The ring C does not require much pressure to initially seat it in place for operation within the socket member, really requiring little more than dropping it into the socket, whereat it will assume substantially the position shown in the drawings. The spring will continually force the stud head toward its seat in the ring, and said ring will in turn be urged axially and caused to shift wedgingly on its tapered seat, to provide a maximum of bearing conformity between the ring and the stud head, so that whenever wear occurs through wear between the stud and ring elements, said axial pressure will continue its pressure and force the ring toward the limiting flange 6, thereby reducing the ring diameter and automatically compensating for the increase of play or clearance caused through such wear. This self-compensating movement of the ring can continue until the ring finally seats against said flange 6 as an end limit of axial movement.

In order that there be little or no likelihood of buckling, breaking or otherwise damaging the parts through the undesired building up of enormous back pressure at the times of forcibly greasing the joint, with a pressure gun or the like, the split made by the separated ring ends will provide an appreciably wide channel or passage, through which said lubricant under pressure from within the chamber may escape to the exterior of the joint through said channel. The pressure plate may have one or more openings 18 therethrough for the passage of the grease as it is fed through the inlet 8. It may again be stressed that although the lubricant channel defined by the ring split may narrow somewhat as the ring contracts, yet this channel is never entirely closed, inasmuch as the ring ends will never abut one another within the socket member; hence there is at no time a complete and dangerous stoppage that might prevent the escape of the lubricant from within the joint.

In the modification illustrated in Fig. 2, an additional coiled spring 18 may be placed under a condition of load and arranged between the closure disk and the bearing ring, this serving too, to urge the ring axially relatively of its seat to compensate for wear as the latter occurs between the bearing parts.

Having thus described my invention, it is obvious that various immaterial modifications may be made in the same without departing from the spirit of my invention; hence I do not wish to be understood as limiting myself to the exact form, arrangement, construction and combination herein shown and described, except as limited by the state of the art to which this invention appertains, and by the claims hereunto appended.

What I claim as new and desire to secure by Letters Patent is:

1. In a tie-rod joint comprising a socket member and a stud member rotatably and tiltably connected thereto, a closure element across one end of said socket member, said socket member having a bore axially therethrough that is tapered in diameter toward the other end of said socket member, said stud member having rounded head within said bore, a split radially expandible ring seated between said head and the tapered portion of said bore and having inner and outer peripheral bearing surfaces to complement and movably engage said head and bore surfaces, the axial depth of said ring being less than the axial length of said tapered portion of the bore so that said ring may be assembled initially spaced from said reduced end of said bore, the split of said ring being constantly open, resilient pressure means between said socket and ring and free of said head to constantly press said ring toward its seated position but permit of its rotational movement, and resilient pressure means independent of said first resilient pressure means and positioned between said closure element and head to yieldably urge the latter onto its seat in said ring.

2. A mechanism as described in claim 1, but further characterized in that said second-mentioned pressure means includes means between said head and closure element to limit movement of said stud axially in one direction independently of said ring.

References Cited in the file of this patent

UNITED STATES PATENTS

| | | |
|---|---|---|
| 1,840,332 | Riches | Jan. 12, 1932 |
| 1,998,728 | Marles | Apr. 23, 1935 |
| 2,115,774 | Hufferd | May 3, 1938 |
| 2,147,815 | Hufferd | Feb. 21, 1939 |
| 2,189,266 | Klages | Feb. 6, 1940 |
| 2,291,161 | Katcher | July 28, 1942 |
| 2,325,845 | Flumerfelt | Aug. 3, 1943 |
| 2,451,060 | Booth | Oct. 12, 1948 |

FOREIGN PATENTS

| | | |
|---|---|---|
| 712,579 | France | July 21, 1931 |
| 136,065 | Austria | Dec. 27, 1933 |
| 582,421 | Germany | July 27, 1933 |